(12) United States Patent
Lin et al.

(10) Patent No.: US 12,044,458 B2
(45) Date of Patent: Jul. 23, 2024

(54) CABINET WITH ANTI-CONDENSATION MECHANISM AND ANTI-CONDENSATION CONTROL METHOD

(71) Applicant: DELTA ELECTRONICS, INC., Taoyuan (TW)

(72) Inventors: Mu-Min Lin, Taoyuan (TW); Bo-Sheng Li, Taoyuan (TW); Chia-Hao Kuo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 89 days.

(21) Appl. No.: 17/518,857

(22) Filed: Nov. 4, 2021

(65) Prior Publication Data
US 2022/0390166 A1 Dec. 8, 2022

(30) Foreign Application Priority Data
Jun. 7, 2021 (TW) .................................. 110120637

(51) Int. Cl.
*F25D 21/04* (2006.01)
*F25D 23/02* (2006.01)
(Continued)

(52) U.S. Cl.
CPC ........... *F25D 21/04* (2013.01); *F25D 23/025* (2013.01); *F25D 29/008* (2013.01);
(Continued)

(58) Field of Classification Search
CPC ...... F25D 21/04; F25D 23/025; F25D 29/008; F25D 2700/02; F25D 2700/12; F25D 2700/14; H01M 50/204
See application file for complete search history.

(56) References Cited

U.S. PATENT DOCUMENTS

| 6,936,372 | B1 * | 8/2005 | Jagota | ................... | H01M 10/48 |
| | | | | | 429/50 |
| 2007/0125100 | A1 * | 6/2007 | Shoenfeld | .......... | G07C 9/00896 |
| | | | | | 62/125 |
| 2016/0352062 | A1 * | 12/2016 | Takigawa | ............... | B23K 26/21 |

FOREIGN PATENT DOCUMENTS

CN 106207720 A 12/2016
CN 207992851 U * 10/2018
(Continued)

OTHER PUBLICATIONS

Translation CN-207992851-U.*

*Primary Examiner* — Elizabeth J Martin
(74) *Attorney, Agent, or Firm* — MUNCY, GEISSLER, OLDS & LOWE, P.C.

(57) ABSTRACT

A cabinet with anti-condensation mechanism is used to control opening and closing a cabinet door of the cabinet. The cabinet includes a control module, a temperature control module, and a locking module. The control module senses a cabinet-inside temperature inside the cabinet, and senses cabinet-outside temperature and a cabinet-outside humidity outside the cabinet to generate a dew-point threshold value. The temperature control module is used to adjust the cabinet-inside temperature. The locking module is used to lock the cabinet door or unlock the cabinet door. The control module controls the locking module according to the cabinet-inside temperature and the dew-point threshold value, and controls the temperature control module to adjust the cabinet-inside temperature to be greater than or equal to the dew-point threshold value when the control module receives a trigger signal.

20 Claims, 6 Drawing Sheets

(51) Int. Cl.
    *F25D 29/00*     (2006.01)
    *H01M 10/42*     (2006.01)
    *H01M 10/48*     (2006.01)
    *H01M 10/635*     (2014.01)
    *H01M 10/657*     (2014.01)
    *H01M 50/204*     (2021.01)

(52) U.S. Cl.
    CPC ......... *H01M 10/425* (2013.01); *H01M 10/48* (2013.01); *H01M 10/486* (2013.01); *H01M 50/204* (2021.01); *F25D 2700/02* (2013.01); *F25D 2700/12* (2013.01); *F25D 2700/14* (2013.01); *H01M 10/4207* (2013.01); *H01M 2010/4271* (2013.01); *H01M 10/635* (2015.04); *H01M 10/657* (2015.04); *H01M 2200/00* (2013.01); *Y02E 60/10* (2013.01)

(56) References Cited

FOREIGN PATENT DOCUMENTS

| | | |
|---|---|---|
| CN | 109193420 A | 1/2019 |
| CN | 109556251 A | 4/2019 |
| JP | 2018073534 A | 5/2018 |
| KR | 200330144 Y1 | 10/2003 |
| KR | 20180003978 A | 1/2018 |
| TW | M408058 U | 7/2011 |

* cited by examiner

FIG.1

| | | To | | | | | |
|---|---|---|---|---|---|---|---|
| | | 20 | 25 | 30 | 35 | 40 | 45 |
| Ho | 100% | 20 | 25 | 30 | 35 | 40 | 45 |
| | 90% | 18 | 23 | 28 | 33 | 38 | 43 |
| | 80% | 16 | 21 | 26 | 31 | 36 | 41 |
| | 70% | 14 | 19 | 24 | 29 | 34 | 39 |
| | 60% | 12 | 17 | 22 | 27 | 32 | 37 |
| | 50% | 10 | 15 | 20 | 25 | 30 | 35 |
| | 40% | 8 | 13 | 18 | 23 | 28 | 33 |
| | 30% | 6 | 11 | 16 | 21 | 26 | 31 |
| | 20% | 4 | 9 | 14 | 19 | 24 | 29 |

CABINET WITH ANTI-CONDENSATION MECHANISM AND ANTI-CONDENSATION CONTROL METHOD

BACKGROUND

Technical Field

The present disclosure relates to a cabinet and a method of controlling the same, and more particularly to a cabinet with anti-condensation mechanism and an anti-condensation control method.

Description of Related Art

The statements in this section merely provide background information related to the present disclosure and do not necessarily constitute prior art.

Nowadays, the demand for electric energy is becoming more and more extensive, so more and more products need to use battery storage cabinets as backup and energy storage devices. In particular, battery storage cabinets with lithium batteries are the most widely used. As the application demand of lithium batteries increases, the operational safety of lithium batteries is gradually being valued. It can be seen from more and more domestic and foreign fire case analysis reports that most of the fires are caused by improper control of the ambient temperature and humidity in the lithium battery energy storage cabinet, which causes condensation and high-voltage arc short-circuit abnormality.

In conventional technology, in order to prolong the service life of the battery and reduce the decline, outdoor battery cabinets will use air-conditioning for cooling to maintain the cabinet-inside temperature in the battery cabinet at 20-30 degrees Celsius. At this condition, if the cabinet-outside temperature is higher than the cabinet-inside temperature and the humidity is high, once the cabinet door is opened and hot and humid air enters the cabinet, condensation will occur on the surface of the internal parts and reduce the insulation, and therefore it will increase the possibility of fire in the lithium battery energy storage cabinet.

SUMMARY

In order to solve the above-mentioned problems, the present disclosure provides a cabinet with anti-condensation mechanism to control opening and closing a cabinet door of the cabinet. The cabinet includes a control module, a temperature control module, and a locking module. The control module senses a cabinet-inside temperature inside the cabinet, and senses a cabinet-outside temperature and a cabinet-outside humidity outside the cabinet to generate a dew-point threshold value. The temperature control module is coupled to the control module and adjusts the cabinet-inside temperature. The locking module is coupled to the control module and the cabinet door and locks the cabinet door or unlocks the cabinet door. The control module controls the locking module according to the cabinet-inside temperature and the dew-point threshold value, and controls the temperature control module to adjust the cabinet-inside temperature to be greater than or equal to the dew-point threshold value when the control module receives a trigger signal.

In order to solve the above-mentioned problems, the present disclosure provides an anti-condensation control method of a cabinet. The method controls opening and closing a cabinet door of the cabinet. The method includes steps of: sensing a cabinet-inside temperature of the cabinet, and sensing a cabinet-outside temperature and a cabinet-outside humidity of the cabinet to generate a dew-point threshold value, determining whether the cabinet-inside temperature is greater than or equal to the dew-point threshold value, locking the cabinet door when determining that the cabinet-inside temperature is less than the dew-point threshold value, and adjusting the cabinet-inside temperature to be greater than or equal to the dew-point threshold value according to a trigger signal, and unlocking the cabinet door.

The main purpose and effect of the present disclosure is to prevent the cabinet door from being opened when there is a high risk of condensation in the cabinet through the mutual control and linkage of the temperature and humidity sensing modules, the temperature control module, and the locking module inside and outside the cabinet, thereby effectively avoiding the occurrence of condensation and short circuit of electrical devices in the accommodation space.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
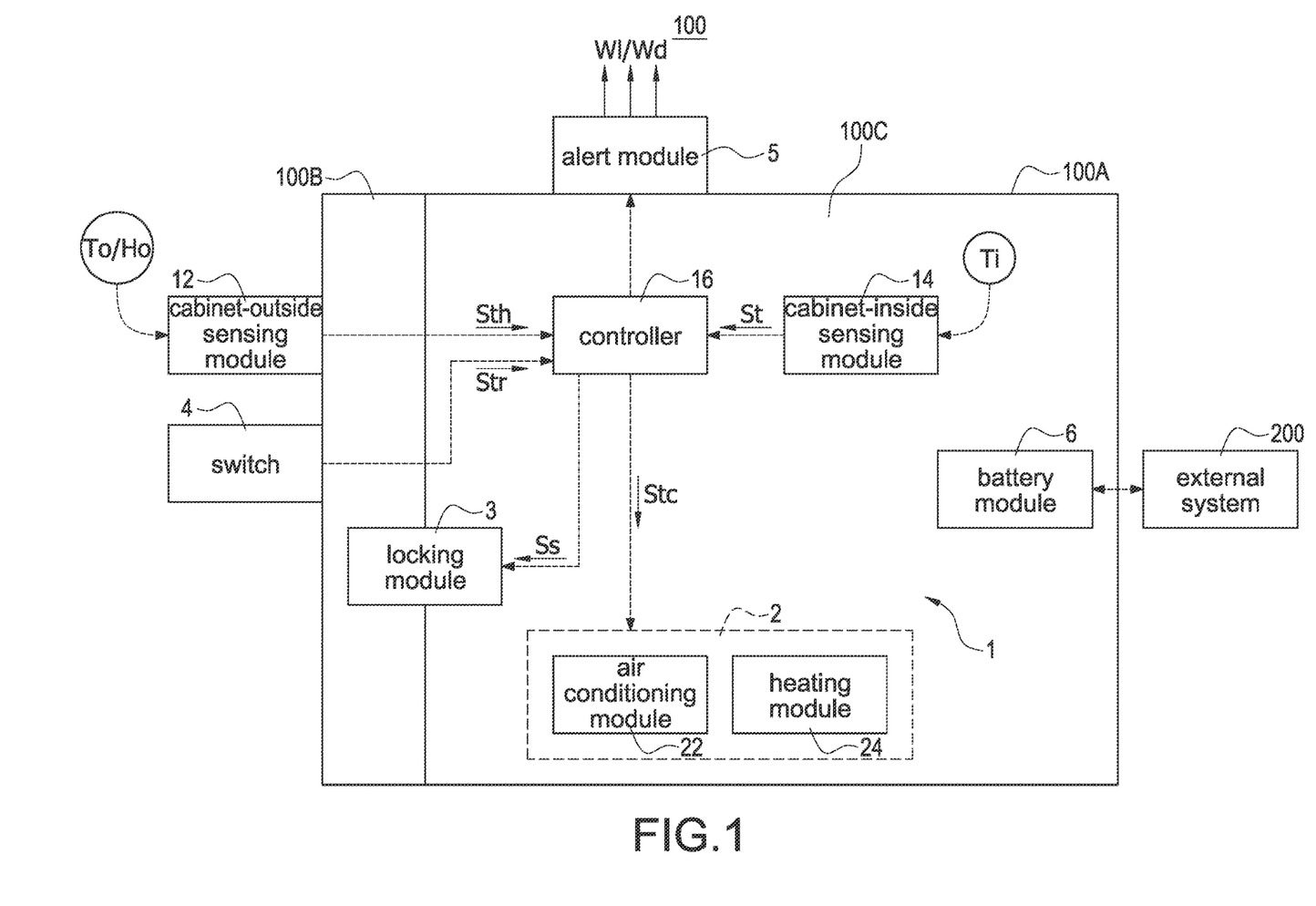
FIG. 1 is a block diagram of a cabinet with anti-condensation mechanism according to the present disclosure.

Please refer to FIG. 1, which shows a block diagram of a cabinet with anti-condensation mechanism according to the present disclosure. The cabinet 100 is usually installed in an open place such as outdoors, and is used to adjust the temperature in the cabinet 100 (hereinafter referred to as a cabinet-inside temperature). The cabinet 100 includes a cabinet body 100A and a cabinet door 100B. The cabinet body 100A and the cabinet door 100B form an accommodation space 100C. The cabinet 100 further includes a control module 1, a temperature control module 2, and a locking module 3. The control module 1 includes a cabinet-outside sensing module 12, a cabinet-inside sensing module 14, and a controller 16. The cabinet-outside sensing module 12 is preferably disposed on an outer surface of the cabinet 100, and the cabinet-outside sensing module 12 includes a temperature sensor and a humidity sensor for sensing temperature and humidity. The cabinet-outside sensing module 12 is used to sense a cabinet-outside temperature To and a cabinet-inside temperature Ho to generate a cabinet-outside temperature humidity signal Sth according to the cabinet-outside temperature To and the cabinet-inside temperature Ho. The cabinet-inside sensing module 14 is preferably disposed in the accommodation space 100C, and the cabinet-inside sensing module 14 includes a temperature sensor for sensing a cabinet-inside temperature Ti to generate a cabinet-inside temperature signal St. The temperature control module 2 is preferably in the accommodation space 100C for adjusting the cabinet-inside temperature Ti. The locking module 3 is coupled to the controller 16 and the cabinet door 100B for locking or unlocking the cabinet door 100B. In particular, the locking module 3 may be disposed inside or outside the accommodation space 100C according to actual needs, and the locking module 3 may be, for example but not limited to, an electromagnetic lock, a central control lock, a controllable mechanical lock, or so on.

Specifically, the temperature control module 2 includes an air conditioning module 22 and a heating module 24, and the air conditioning module 22 and the heating module 24 are coupled to the controller 16. The air conditioning module 22 is used to adjust the cabinet-inside temperature Ti, and the heating module 24 is used to increase the cabinet-inside temperature Ti. In particular, the air conditioning module 22 may be a device for adjusting the ambient temperature such as an air conditioner, a fan, or so on. The heating module 24 may be a heating device such as a resistance heater, a heating film, an electric heater, or so on. The controller 16 is preferably disposed in the accommodation space 100C, and the controller 16 is coupled to the cabinet-outside sensing module 12, the cabinet-inside sensing module 14, the temperature control module 2, and the locking module 3. The controller 16 is used to receive the cabinet-outside temperature humidity signal Sth and the cabinet-inside temperature signal St to realize the cabinet-outside temperature To, the cabinet-inside temperature Ho, and the cabinet-inside temperature Ti. The controller 16 provides a temperature control signal Stc to the temperature control module 2 to control the temperature control module 2 to adjust the cabinet-inside temperature Ti. In addition, the controller 16 provides an open-close signal Ss to the locking module 3 to control the locking module 3 to lock or unlock the cabinet door 100B. Preferably, the locking module 3 is an electromagnetic lock, and the controller 16 controls locking or unlocking the cabinet door 100B by whether controlling an excitation (single excitation or continuous excitation) of the electromagnetic lock. In particular, the controller 16 may be an analog-digital controller composed of circuits, a chip with a microcontroller controlled by written programs, or a microcircuit component.

The cabinet 100 further a switch 4, an alert module 5, and a battery module 6. The switch 4 and the alert module 5 are coupled to the controller 16. The switch 4 may be a touch switch, a DIP switch, a remote-control switch, a touch screen, or other devices capable of generating a trigger by a trigger operation, i.e., by an operation of triggering the switch 4, and the switch 4 is preferably disposed on an outer surface of the cabinet 100. The alert module 5 may be a visual, auditory, or tactile alert device such as a buzzer, an alert light, a display panel, a vibrator, or so on, and the alert module 5 is preferably disposed on an outer surface of the cabinet 100. The switch 4 generates a trigger signal Str according to the trigger operation, and provides the trigger signal Str to the controller 16. When the controller 16 provides the open-close signal Ss to lock or unlock the cabinet door 100B, the controller 16 also provides a locking signal Sl (when the cabinet door 100B is locked) and an unlocking signal Sd (when the cabinet door 100B is unlocked) to the alert module 5 so that the alert module 5 respectively generates a (visual, auditory, or tactile) locking alert Wl and an (visual, auditory, or tactile) unlocking alert Wd.

The battery module 6 is disposed in the accommodation space 100C for receiving or delivering electricity power from or to an external system 200. Specifically, the cabinet 100 of the present disclosure is provided to control the temperature of the internal electronic equipment (such as but not limited to conversion devices, communication equipment, etc.), and avoid condensation in the cabinet due to improper humidity and temperature control, resulting in poor insulation and short-circuited danger of internal electronic equipment. Therefore, the cabinet 100 is particularly suitable for occasions where the battery module 6 is arranged outdoors for receiving or delivering electricity power. In particular, the battery module 6 may be, for example but not limited to, a storage battery, a lithium battery, and other devices that have a large amount of power storage. In order to prolong the service life and reduce the deterioration of most battery modules 6, the cabinet 100 uses the air conditioning module 22 for cooling to maintain the cabinet-inside temperature Ti within the predetermined temperature range. In particular, the predetermined temperature range (for example but not limited to 20-30 degrees Celsius) is usually constituted by an upper limit value and a lower limit value of an optimal operation ambient temperature (for example but not limited to 25 degrees Celsius) of the battery module 6. However, when the cabinet-outside temperature To and the cabinet-outside humidity Ho of the cabinet 100 are higher than the cabinet-inside temperature Ti, once the cabinet door 100B is opened and the hot and humid air enters the cabinet 100, condensation will be generated on the surface of the internal components, resulting in insulation reduction.

Therefore, the main purpose and effect of the present disclosure is: the temperature and humidity sensing modules (12, 14) inside and outside the cabinet 100 can be controlled and linked with the air conditioning module 22, the heating module 24, and the locking module 3 to prevent the cabinet door 100B from being opened when there is a high risk of condensation in the cabinet 100, thereby effectively avoiding the occurrence of condensation and short circuit of the electric devices in the accommodation space 100C. In particular, in some special conditions (for example but not limited to the limited internal space of the cabinet 100), the control module 1, the temperature control module 2, the locking module 3, and the alert module 5 may be arranged inside or outside the accommodation space 100C according to actual needs, and the specific configuration positions of the control module 1, the temperature control module 2, the locking module 3, and the alert module 5 are not limited. Moreover, in one embodiment, the signal transmission may be wired or wireless transmission (indicated by the dotted lines). When the wireless transmission is used, each module may include a transmission unit (not shown) for sending and receiving signals so that each module may be configured more flexibly.

Figure 2:
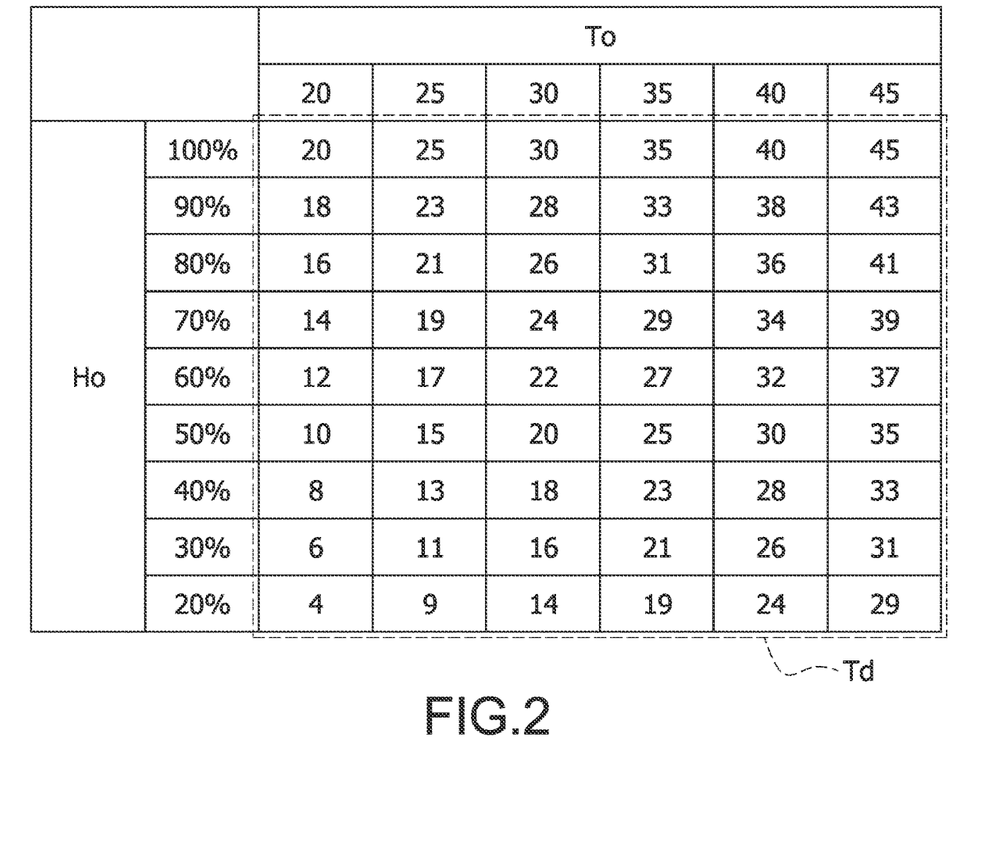
FIG. 2 is a schematic table of a dew-point temperature corresponding to temperature and humidity of the cabinet with anti-condensation mechanism according to the present disclosure.

Please refer to FIG. 2, which shows a schematic table of a dew-point temperature corresponding to temperature and humicity of the cabinet with anti-condensation mechanism according to the present disclosure, and also refer to FIG. 1. The cause of condensation is directly related to the relative humidity and the present dew-point temperature. The dew-point temperature refers to a temperature at which the gaseous water contained in the air reaches saturation and condenses into liquid water under a fixed pressure. When the relative humidity and actual temperature are known, the dew-point temperature may be approximated by the following formulas:

$$T_d = \frac{b\gamma(To, Ho)}{a - \gamma(To, Ho)} \quad \text{(formula 1)}$$

$$\gamma(To, Ho) = \frac{aT}{b+T} + \ln(Ho/100) \quad \text{(formula 2)}$$

In which, To is the cabinet-outside temperature, Td is the dew-point temperature (in Celsius), Ho is the cabinet-outside humidity (expressed as a percentage of relative humidity), In is the natural logarithm, constant a is 17.27, and constant b is 237.7. Therefore, the dew-point temperature table shown in FIG. 2 can be established. The above-mentioned formula 1 and formula 2 can be written in the controller 16, and the dew-point temperature (i.e., the dew-point threshold value) can be calculated by the sensed cabinet-outside temperature To and the sensed cabinet-outside humidity Ho. Alternatively, the dew-point temperature table shown in FIG. 2 can be recorded in the controller 16, and the dew-point threshold value can be acquired by looking up the dew-point temperature table through the sensed cabinet-outside temperature To and the sensed cabinet-outside humidity Ho.

The controller 16 senses the cabinet-outside temperature To and the cabinet-outside humidity Ho to generate the dew-point threshold value, and determines whether a risk of condensation will occur according to the cabinet-inside temperature Ti and the dew-point threshold value. In particular, the action (operation) of sensing the cabinet-outside temperature To and the cabinet-outside humidity Ho to generate the dew-point threshold value can be performed at any time. When there is no risk of condensation (that is, the cabinet-inside temperature Ti is greater than or equal to the dew-point threshold value), the controller 16 provides the open-close signal Ss to control the locking module 3 to unlock the cabinet door 100B. At this condition, the controller 16 controls the air conditioning module 22 through the temperature control signal Stc to maintain the cabinet-inside temperature Ti at the predetermined temperature range (for example but not limited to 30 degrees Celsius). The controller 16 also provides the open-close signal Ss to continuously control the locking module 3 to lock the cabinet door 100B to prevent the cabinet door 100B from opening accidentally without alerting. Therefore, when the controller 16 receives the trigger signal Str, the cabinet door 100B is unlocked by the locking module 3 to provide the unlocking signal Sd to control the alert module 5 to provide the unlocking alert Wd.

When the controller 16 determines that the risk of condensation will occur (that is, the cabinet-inside temperature Ti is less than the dew-point threshold value), the controller 16 provides the open-close signal Ss to control the locking module 3 to lock the cabinet door 100B. Afterward, when the controller 16 receives the trigger signal Str, the controller 16 provides the temperature control signal Stc to control the heating module 24 to increase the cabinet-inside temperature Ti from the predetermined temperature range to be greater than or equal to the dew-point threshold value. When the controller 16 receives the trigger signal Str, the controller 16 also provides the locking signal Sl to control the alert module 5 to provide the locking alert Wl. Therefore, the present state of the cabinet 100 can be clearly indicated. When the cabinet-inside temperature Ti is greater than or equal to the dew-point threshold value, the controller 16 provides the open-close signal Ss to control the locking module 3 to unlock the cabinet door 100B. The cabinet door 100B is unlocked by the locking module 3 to provide the unlocking signal Sd to control the alert module 5 to provide the unlocking alert Wd.

Moreover, in order to prevent the cabinet-inside temperature Ti from the predetermined temperature range to be greater than or equal to the dew-point threshold value by the heating module 24 however the air conditioning module 22 is not turned off to cause the cabinet-inside temperature Ti to rise (increase) too slowly, when the controller 16 receives the trigger signal Str, the controller 16 first disables the air conditioning module 22 to forcibly turn off the air conditioning module 22. Afterward, a loop related to the heating module 24 is connected by switching a relay (not shown) so as to start the cabinet 100 to perform a temperature recovery process of the accommodation space 100C of the cabinet 100.

Figure 3:
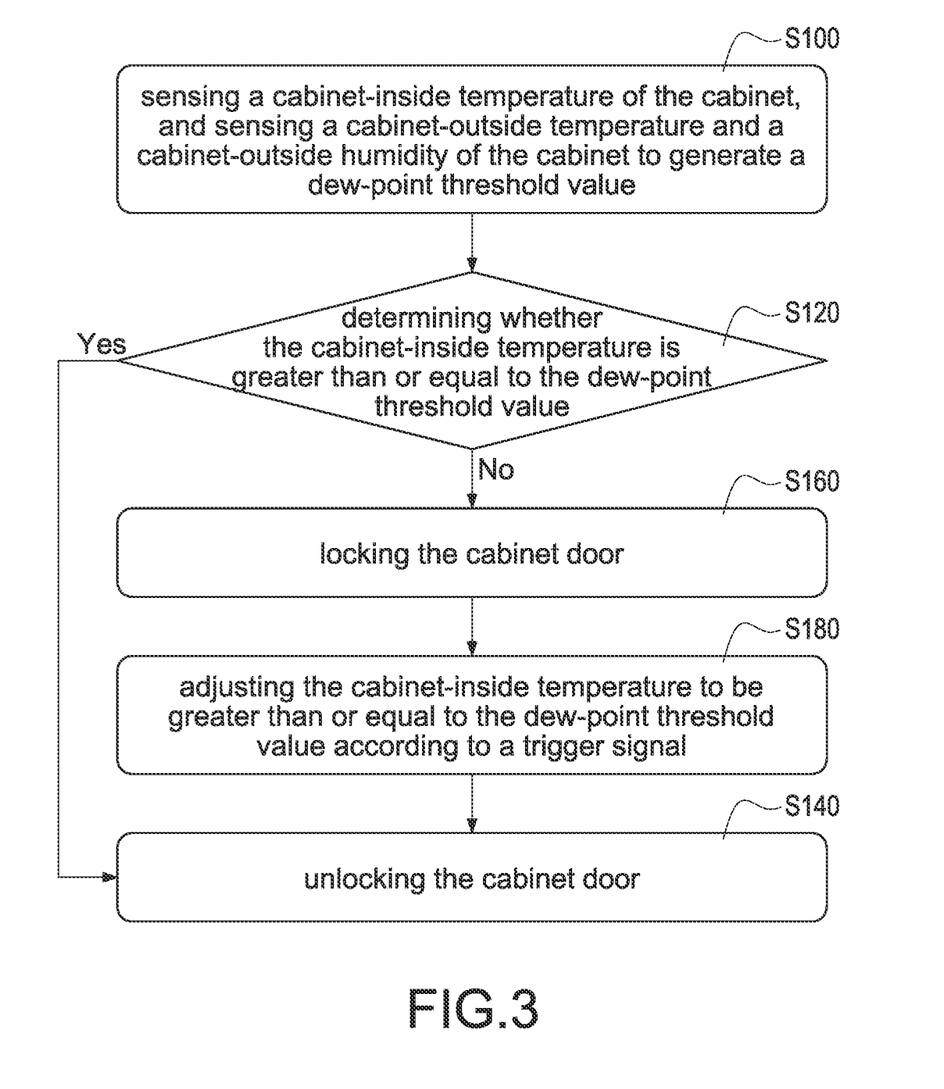
FIG. 3 is a flowchart of an anti-condensation control method according to the present disclosure.

Please refer to FIG. 3, which shows a flowchart of an anti-condensation control method according to the present disclosure, and also refer to FIG. 1 to FIG. 2. The anti-condensation control method is provided to control opening and closing the cabinet door 100B of the cabinet 100 to prevent the cabinet door 100B from being opened when there is a high risk of condensation in the cabinet 100, thereby effectively avoiding the occurrence of condensation and short circuit of the electric devices in the accommodation space 100C. The control method mainly includes steps of: first, sensing a cabinet-inside temperature of the cabinet, and sensing a cabinet-outside temperature and a cabinet-outside humidity of the cabinet to generate a dew-point threshold value (S100). Preferably, the controller 16 of the control module 1 is used to sense the cabinet-outside temperature To and the cabinet-outside Ho to generate the dew-point threshold value, and determines whether a risk of condensation will occur according to the cabinet-inside temperature Ti and the dew-point threshold value. In particular, the action (operation) of sensing the cabinet-outside temperature To and the cabinet-outside humidity Ho to generate the dew-point threshold value can be performed at any time.

Afterward, determining whether the cabinet-inside temperature is greater than or equal to the dew-point threshold value (S120). Afterward, unlocking the cabinet door when determining that the cabinet-inside temperature is greater than or equal to the dew-point threshold value (S140). Preferably, when there is no risk of condensation (that is, the cabinet-inside temperature Ti is greater than or equal to the dew-point threshold value), the controller 16 provides the open-close signal Ss to control the locking module 3 to unlock the cabinet door 100B so that the user can open the cabinet door 100B. Afterward, locking the cabinet door when determining that the cabinet-inside temperature is less than the dew-point threshold value (S160). Preferably, when the controller 16 determines that the risk of condensation will occur (that is, the cabinet-inside temperature Ti is less than the dew-point threshold value), the controller 16 provides the open-close signal Ss to control the locking module 3 to lock the cabinet door 100B. Afterward, adjusting the cabinet-inside temperature to be greater than or equal to the dew-point threshold value according to the trigger signal (S180). Preferably, when the controller 116 receives the trigger signal Str, the controller 16 provides the temperature control signal Stc to control the heating module 24 to increase the cabinet-inside temperature Ti from the predetermined temperature range to be greater than or equal to the dew-point threshold value since the cabinet-inside temperature Ti is less than the dew-point threshold value. Finally, returning to the step (S140).

In the step (S100), the above-mentioned formula 1 and formula 2 can be written in the controller 16, and the dew-point temperature (i.e., the dew-point threshold value) can be calculated by the sensed cabinet-outside temperature To and the sensed cabinet-outside humidity Ho. Alternatively, the dew-point temperature table shown in FIG. 2 can be recorded in the controller 16, and the dew-point threshold value can be acquired by looking up the dew-point temperature table through the sensed cabinet-outside temperature To and the sensed cabinet-outside humidity Ho. In addition, in the step (S100), the controller 16 controls the air conditioning module 22 through the temperature control signal Stc to maintain the cabinet-inside temperature Ti at the predetermined temperature range. In particular, the predetermined temperature range (for example but not limited to 20-30 degrees Celsius) is usually constituted by an upper limit value and a lower limit value of an optimal operation ambient temperature (for example but not limited to 25 degrees Celsius) of an internal power device, such as a battery module 6.

In the step (S180), in order to prevent the cabinet-inside temperature Ti from the predetermined temperature range to be greater than or equal to the dew-point threshold value by the heating module 24 however the air conditioning module 22 is not turned off to cause the cabinet-inside temperature Ti to rise (increase) too slowly, when the controller 16 receives the trigger signal Str, the controller 16 first disables the air conditioning module 22 to forcibly turn off the air conditioning module 22.

In the step (S140) to the step (S160), preferably, the locking module 3 is an electromagnetic lock, and the cabinet door 100B is locked or unlocked by whether controlling an excitation of the electromagnetic lock. Moreover, in the step (S180) to the step (S140), when the controller 16 provides the open-close signal Ss to lock or unlock the cabinet door 100B, the controller 16 also provides a locking signal Sl (when the cabinet door 100B is locked) and an unlocking signal Sd (when the cabinet door 100B is unlocked) to the alert module 5 so that the alert module 5 respectively generates a (visual, auditory, or tactile) locking alert Wl and an (visual, auditory, or tactile) unlocking alert Wd.

Figure 4A:
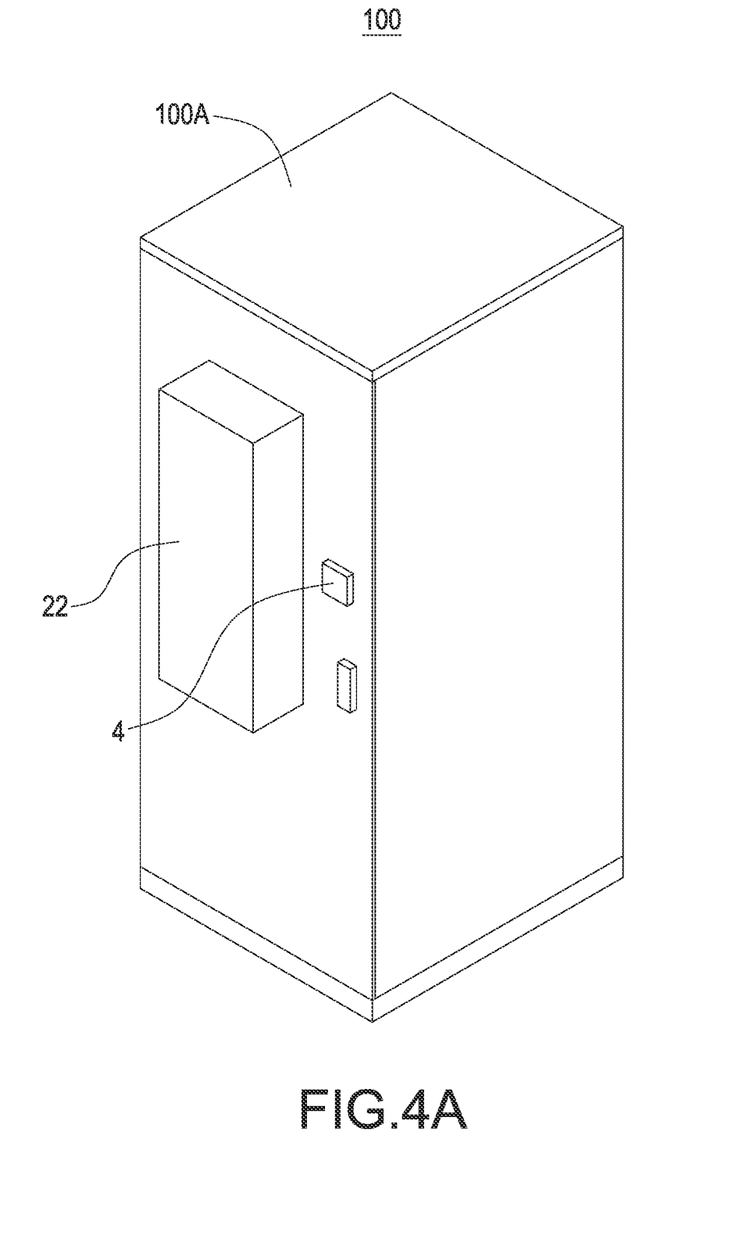
FIG. 4A is an appearance structure diagram of the cabinet with anti-condensation mechanism according to the present disclosure.
Figure 4B:
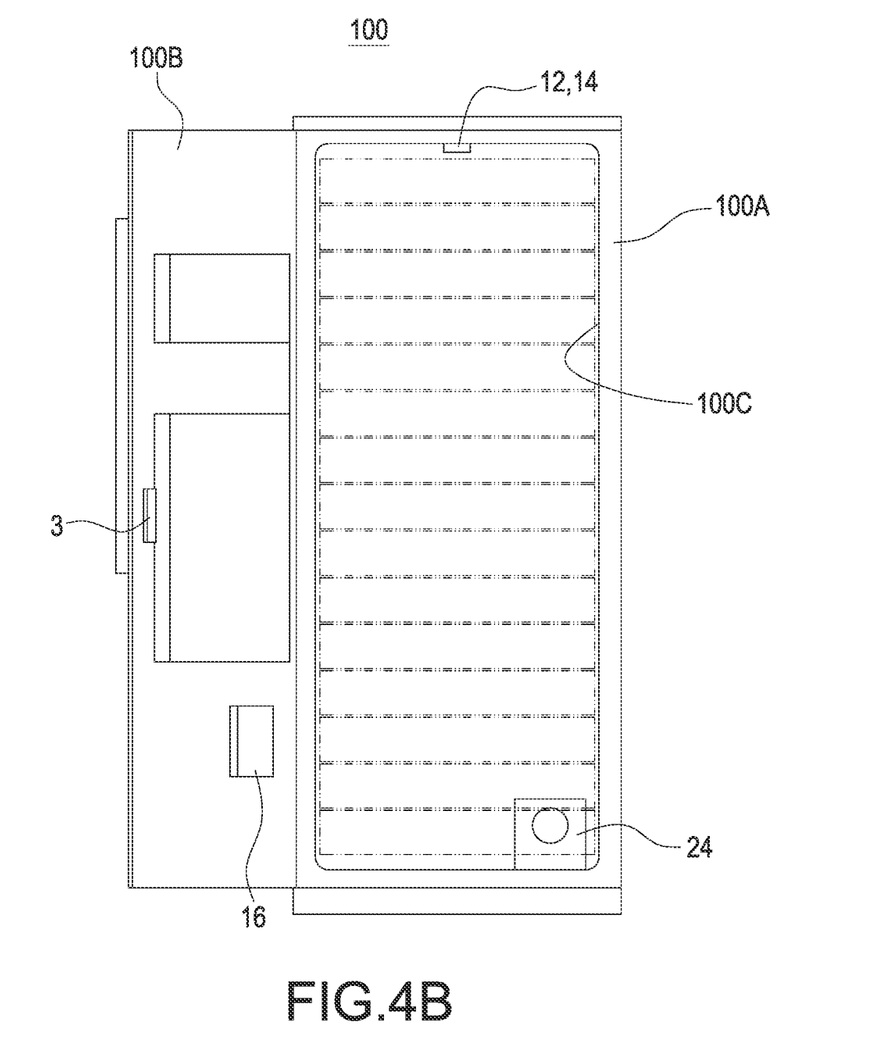
FIG. 4B is a cabinet configuration diagram of the cabinet with anti-condensation mechanism according to the present disclosure.
Figure 4C:
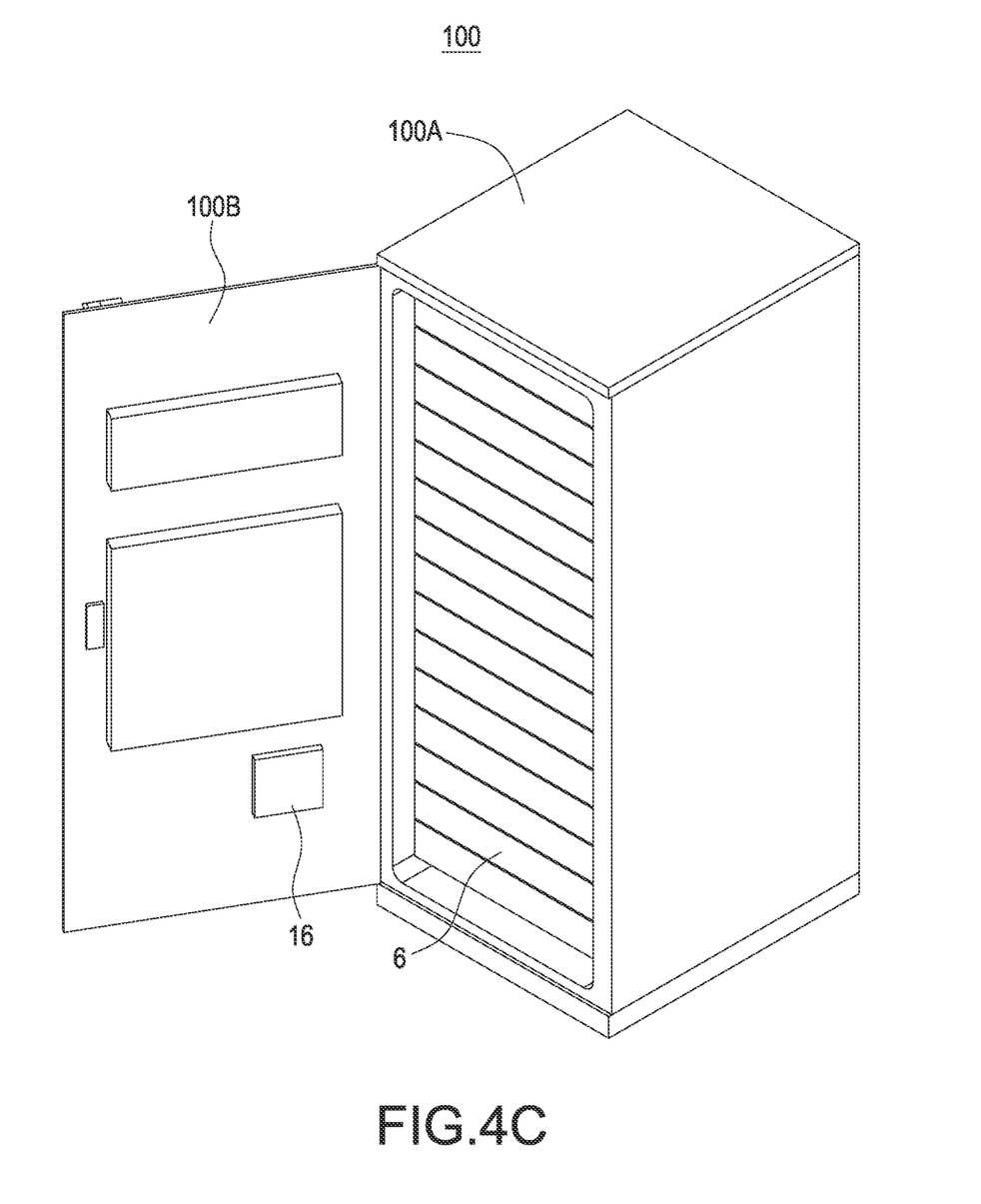
FIG. 4C is an appearance structure diagram of opening a cabinet door of the cabinet with anti-condensation mechanism according to the present disclosure.

Please refer to FIG. 4A, which shows an appearance structure diagram of the cabinet with anti-condensation mechanism according to the present disclosure, FIG. 4B, which shows a cabinet configuration diagram of the cabinet with anti-condensation mechanism according to the present disclosure, and FIG. 4C, which shows an appearance structure diagram of opening a cabinet door of the cabinet with anti-condensation mechanism according to the present disclosure, and also refer to FIG. 1 to FIG. 3. As shown in FIG. 4A, the cabinet 100 includes the cabinet body 100A, and the air conditioning module 22 and the switch 4 are disposed on one of the surfaces of the cabinet 100. The air conditioning module 22 is used to adjust the cabinet-inside temperature Ti in the accommodation space 100C of the cabinet 100. The switch 4 is used for the user to press to generate a trigger. As shown in FIG. 4B and FIG. 4C, the locking module 3 (i.e., the electromagnetic lock) and the controller 16 are disposed on the cabinet door 100B, and the sensing modules (12, 14), the heating module 24, and the battery module 6 are disposed in the accommodation space 100C. In particular, FIG. 4A to FIG. 4C are different configuration modes of the cabinet 100, and the actual configuration mode may be varied according to actual requirements.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A cabinet with anti-condensation configured to control opening and closing a cabinet door of the cabinet, the cabinet comprising:
   a control module, configured to sense a cabinet-inside ambient temperature inside the cabinet, and sense a cabinet-outside temperature and a cabinet-outside humidity outside the cabinet to generate a dew-point threshold value, and the control module comprises:
   a cabinet-inside sensing module, configured to sense the cabinet-inside ambient temperature and generate a cabinet-inside temperature signal, and obtain the cabinet-inside ambient temperature based on the cabinet-inside temperature signal,
   a temperature control module, coupled to the control module and configured to adjust the cabinet-inside ambient temperature, and
   a locking module, coupled to the control module and the cabinet door and configured to lock the cabinet door or unlock the cabinet door,
   wherein the control module controls the locking module according to the cabinet-inside ambient temperature and the dew-point threshold value, and controls the temperature control module to adjust the cabinet-inside ambient temperature to be greater than or equal to the dew-point threshold value when the control module receives a trigger signal.

2. The cabinet as claimed in claim 1, wherein when the control module determines that the cabinet-inside ambient temperature is less than the dew-point threshold value, the control module controls the locking module to lock the cabinet door.

3. The cabinet as claimed in claim 1, wherein when the control module receives the trigger signal and determines that the cabinet-inside ambient temperature is greater than or equal to the dew-point threshold value, the control module controls the locking module to unlock the cabinet door.

4. The cabinet as claimed in claim 1, wherein the control module further comprises:
   a cabinet-outside sensing module, configured to sense the cabinet-outside temperature and the cabinet-outside humidity to generate a cabinet-outside temperature humidity signal,
   and
   a controller coupled to the cabinet-outside sensing module, the cabinet-inside sensing module, the temperature control module, and the locking module,
   wherein the controller provides a temperature control signal and an open-close signal to control the temperature control module by the temperature control signal and to control the locking module by the open-close signal according to the cabinet-outside temperature humidity signal, the cabinet-inside temperature signal, and the trigger signal.

5. The cabinet as claimed in claim 4, wherein the controller records a dew-point temperature table, and looks up the dew-point temperature table through the cabinet-outside temperature and the cabinet-outside humidity to acquire the dew-point threshold value.

6. The cabinet as claimed in claim 4, wherein the locking module is an electromagnetic lock, and the control module controls whether to excite the electromagnetic lock by the open-close signal to lock or unlock the cabinet door.

7. The cabinet as claimed in claim 1, wherein the temperature control module comprises:
an air conditioning module, coupled to the control module and configured to adjust the cabinet-inside ambient temperature, and
a heating module, coupled to the control module and configured to increase the cabinet-inside ambient temperature,
wherein the control module controls the air conditioning module to maintain the cabinet-inside ambient temperature at a predetermined temperature range, and controls the heating module to increase the cabinet-inside ambient temperature from the predetermined temperature range to be greater than or equal to the dew-point threshold value according to the trigger signal.

8. The cabinet as claimed in claim 7, wherein the control module disables the air conditioning module according to the trigger signal.

9. The cabinet as claimed in claim 7, further comprising:
a battery module, disposed inside the cabinet and configured to receive or deliver an electricity power from or to an external system,
wherein the predetermined temperature range is constituted by an upper limit value and a lower limit value of an optimal operation ambient temperature of the battery module.

10. The cabinet as claimed in claim 1, further comprising:
an alert module, coupled to the control module,
wherein the control module controls the alert module to provide an unlock alert when the locking module unlocks the cabinet door.

11. The cabinet as claimed in claim 10, wherein the control module controls the alert module to provide a lock alert when the locking module locks the cabinet door.

12. The cabinet as claimed in claim 1, further comprising:
a switch, disposed on the cabinet and coupled to the control module,
wherein the switch provides the trigger signal to the control module according to a trigger operation.

13. An anti-condensation control method of a cabinet, configured to control opening and closing a cabinet door of the cabinet, the anti-condensation control method comprising steps of:

sensing a cabinet-inside ambient temperature to generate a cabinet-inside temperature signal;
obtaining the cabinet-inside ambient temperature according to the cabinet-inside temperature signal, and sensing a cabinet-outside temperature and a cabinet-outside humidity of the cabinet to generate a dew-point threshold value,
determining whether the cabinet-inside ambient temperature is greater than or equal to the dew-point threshold value,
locking the cabinet door when determining that the cabinet-inside ambient temperature is less than the dew-point threshold value, and adjusting the cabinet-inside ambient temperature to be greater than or equal to the dew-point threshold value according to a trigger signal, and
unlocking the cabinet door.

14. The anti-condensation control method as claimed in claim 13, further comprising a step of:
unlocking the cabinet door when determining that the cabinet-inside ambient temperature is greater than or equal to the dew-point threshold value.

15. The anti-condensation control method as claimed in claim 13, further comprising a step of:
recording a dew-point temperature table, and acquiring the dew-point threshold value by looking up the dew-point temperature table through the cabinet-outside temperature and the cabinet-outside humidity.

16. The anti-condensation control method as claimed in claim 13, further comprising a step of:
locking or unlocking the cabinet door by whether controlling an excitation of an electromagnetic lock.

17. The anti-condensation control method as claimed in claim 13, further comprising steps of:
controlling an air conditioning module to maintain the cabinet-inside ambient temperature at a predetermined temperature range, and
controlling a heating module according to the trigger signal to increase the cabinet-inside ambient temperature from the predetermined temperature range to be greater than or equal to the dew-point threshold value.

18. The anti-condensation control method as claimed in claim 17, further comprising a step of:
disabling the air conditioning module according to the trigger signal.

19. The anti-condensation control method as claimed in claim 13, further comprising a step of:
providing a lock alert according to locking the cabinet door.

20. The anti-condensation control method as claimed in claim 13, further comprising a step of:
providing an unlock alert according to unlocking the cabinet door.

* * * * *